(12) United States Patent
Agathocleous et al.

(10) Patent No.: US 11,664,545 B2
(45) Date of Patent: May 30, 2023

(54) FAST CHARGING COOLING LOOP HEAT EXCHANGER

(71) Applicant: Hanon Systems, Daejeon (KR)

(72) Inventors: Nicos Agathocleous, Canton, MI (US); Daniel Lumley, Novi, MI (US); David Diebel, Livonia, MI (US)

(73) Assignee: HANON SYSTEMS, Daejeon (KR)

( * ) Notice: Subject to any disclaimer, the term of this patent is extended or adjusted under 35 U.S.C. 154(b) by 422 days.

(21) Appl. No.: 16/830,651

(22) Filed: Mar. 26, 2020

(65) Prior Publication Data

US 2020/0343610 A1    Oct. 29, 2020

Related U.S. Application Data

(60) Provisional application No. 62/839,084, filed on Apr. 26, 2019.

(51) Int. Cl.
*H01M 10/6568* (2014.01)
*B60L 53/30* (2019.01)
*H01M 10/613* (2014.01)
*H01M 10/6556* (2014.01)
*H01M 10/625* (2014.01)
*H01M 10/44* (2006.01)

(52) U.S. Cl.
CPC ......... *H01M 10/6568* (2015.04); *B60L 53/30* (2019.02); *H01M 10/443* (2013.01); *H01M 10/613* (2015.04); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

2010/0089669 A1    4/2010  Taguchi
2017/0217279 A1    8/2017  Jalilevand et al.

*Primary Examiner* — Sarah A. Slifka
(74) *Attorney, Agent, or Firm* — Shumaker, Loop & Kendrick, LLP; James D. Miller

(57) ABSTRACT

A charging system includes an electric vehicle having a battery coolant circuit including a charging heat exchanger and a battery as well as a charging station including a charging coolant and a cooling heat exchanger for cooling the charging coolant. The charging coolant is selectively placed in fluid communication and heat exchange communication with the charging heat exchanger of the electric vehicle. The charging heat exchanger is disposed on a charging coolant flow path formed in the electric vehicle that extends from an inlet port configured for coupling to an inlet fitting of the charging station to an outlet port configured for coupling to an outlet fitting of the charging station.

7 Claims, 2 Drawing Sheets

FAST CHARGING COOLING LOOP HEAT EXCHANGER

CROSS-REFERENCE TO RELATED APPLICATIONS

This patent application claims priority to U.S. Provisional Patent Application Ser. No. 62/839,084, filed on Apr. 26, 2019, the entire disclosure of which is hereby incorporated herein by reference.

FIELD OF THE INVENTION

The present invention relates to a heat exchanger for cooling a battery of an electric vehicle, and more specifically, to a coolant circuit circulating a first coolant and having a heat exchanger in heat exchange relationship with a second coolant originating from a charging station for cooling the battery during a fast charging process.

BACKGROUND OF THE INVENTION

Electric vehicles and hybrid electric vehicles typically include a battery for generating the power necessary to drive the associated vehicle, wherein the battery must be intermittently charged in order to store the energy to be expended during each period of operation of the associated electric vehicle. The charging of the battery may include the use of onboard charging cables that electrically connect the associated battery to an onboard battery charger of the electric vehicle. The onboard battery charger may be electrically connected to a charging port of the vehicle, wherein the charging port may be adapted for coupling with an external power source. For example, the charging port may be adapted for coupling to a corresponding component of a charging station providing electrical energy for charging the battery.

It is beneficial to complete the charging process of the battery as fast as possible in order to avoid undesired periods of inactivity of the electric vehicle. As such, it is desirable to increase the rate at which the battery is charged by increasing the current flow supplied to the battery assembly during the charging process. For example, the aforementioned charging stations may be configured for providing what is referred to as a "fast charging" session wherein the battery of the electric vehicle is charged in expedited fashion via the increased current.

However, such an increase in current flow tends to correspond to an increase in heat generated by the battery during the charging session, which in turn leads to an increased need for cooling of the battery. One method for cooling the battery may involve the utilization of a refrigerant of a refrigerant circuit of a heating, ventilating, and air conditioning (HVAC) system of the electric vehicle. The refrigerant may be used for removing heat from a coolant of a coolant circuit associated with the cooling of the battery. For example, the refrigerant may be passed through a heat exchanger, also referred to as a chiller, disposed downstream of an expansion valve of the refrigerant circuit such that the refrigerant is in a low pressure and low temperature gaseous form. The chiller may be in fluid and heat exchange relationship with the coolant of the coolant circuit to allow the heat of the battery to be rejected to the refrigerant within the chiller.

It has been found that the compressor associated with the refrigerant circuit does not typically have the capacity to cool the battery to the desired degree during a fast charging session via exclusive use of the refrigerant passed chiller, and such attempts to adequately cool the battery via the refrigerant passed chiller further include the compressor being operated at a maximum capacity. The operation of the compressor at maximum capacity may lead to significant noise, vibration, and harshness (NVH) that can be heard in the passenger compartment of the vehicle during the charging session. Prolonged operation of the compressor at the maximum cooling capacity also tends to compromise the durability thereof. In order to overcome these concerns, the HVAC system of the vehicle may require modifications that increase the packaging space of the HVAC system or the power required to operate the HVAC system in an undesired fashion.

Additionally, the use of the refrigerant to aid in cooling the battery may result in a significantly decreased cooling capacity of the HVAC system in delivering cooled air to the passenger compartment of the vehicle during the charging process. As such, the electric vehicle may not be able to provide the desired comfort to a passenger of the electric vehicle during or immediately after the fast charging session.

For each of the foregoing reasons, it would be desirable to provide a system and method for cooling the battery of an electric vehicle during a fast charging session that does not require the operation of the HVAC system at maximum capacity thereof for exclusively transferring the heat generated from the battery to a refrigerant of the HVAC system.

SUMMARY OF THE INVENTION

Compatible and attuned with the present invention, an improved system and method for cooling the battery of an electric vehicle during a charging process thereof has been surprisingly discovered.

In one embodiment of the invention, an electric vehicle comprises a battery coolant circuit including a battery and a charging heat exchanger. The battery coolant circuit is circulated by a battery coolant in fluid communication and heat exchange communication with each of the battery and the charging heat exchanger. The charging heat exchanger is configured for selective fluid communication and heat exchange communication with a charging coolant originating external to the electric vehicle.

According to another embodiment of the invention, a charging station configured for use with an electric vehicle during a charging of a battery thereof is disclosed. The charging station comprises a supply of a charging coolant, a cooling heat exchanger configured to lower a temperature of the charging coolant when passing therethrough, an inlet conduit in selective fluid communication with the charging coolant and configured for coupling to an inlet port of the electric vehicle, and an outlet conduit in selective fluid communication with the charging coolant and configured for coupling to an outlet port of the electric vehicle.

A method of cooling a battery of an electric vehicle is also disclosed. The method comprises the steps of: providing an electric vehicle including a battery coolant circuit having a battery and a charging heat exchanger, the battery coolant circuit circulated by a battery coolant; providing a charging station having a charging coolant and a cooling heat exchanger for cooling the charging coolant; and placing the charging heat exchanger in fluid communication and heat exchange communication with the charging coolant of the charging station to transfer heat from the battery coolant to the charging coolant.

BRIEF DESCRIPTION OF THE DRAWINGS

The above, as well as other objects and advantages of the invention, will become readily apparent to those skilled in the art from reading the following detailed description of a preferred embodiments of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
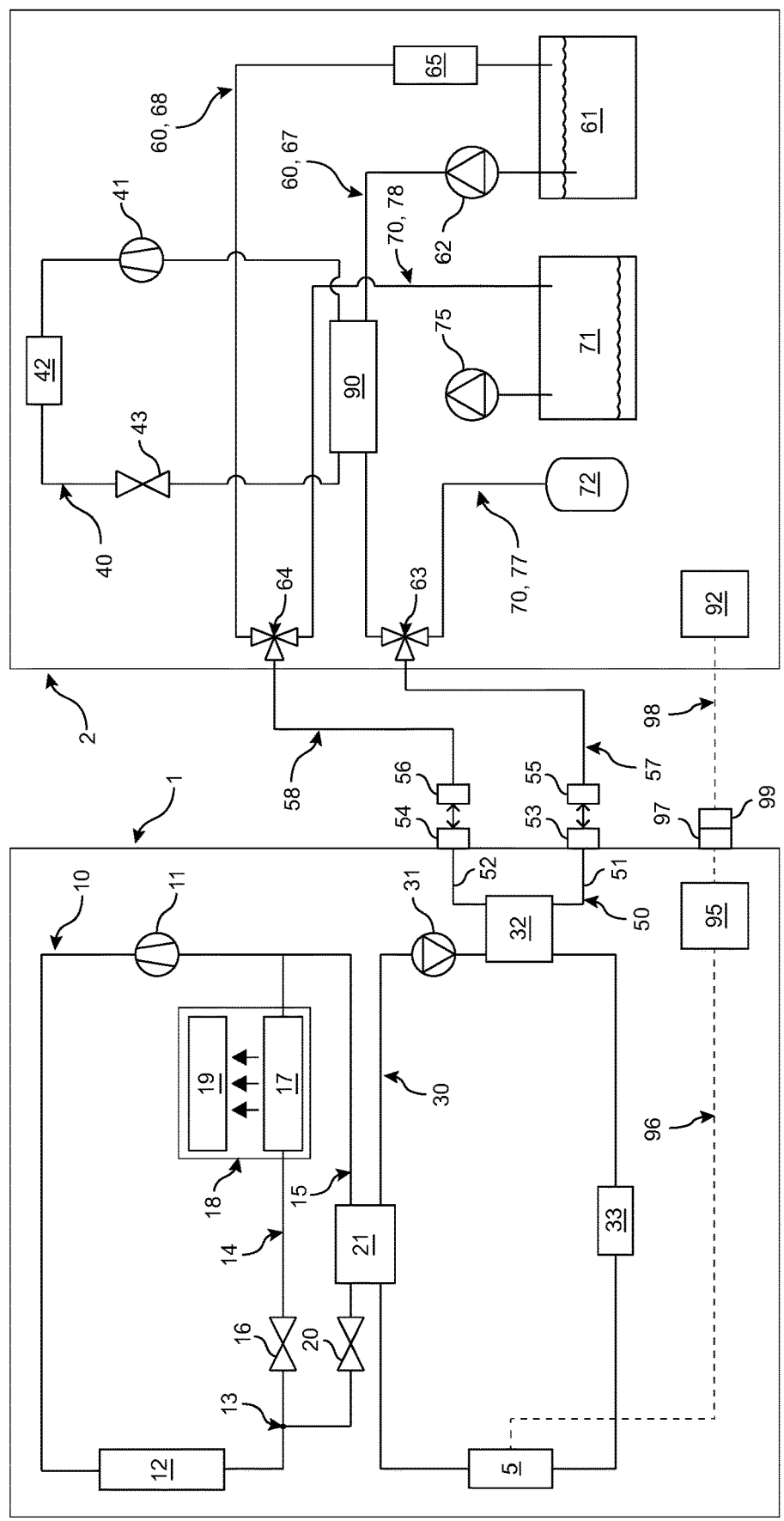
FIG. 1 is a schematic representations of a charging system including an electric vehicle having a refrigerant circuit and a battery coolant circuit as well as a charging station according to an embodiment of the present invention.

FIG. 1 illustrates a battery charging system including both an electric vehicle 1 and a charging station 2 according to an embodiment of the present invention. The electric vehicle 1 and the charging station 2 are each adapted to operate in combination during a charging session of a battery 5 of the electric vehicle 1. More specifically, portions of the electric vehicle 1 and the charging station 2 cooperate to form a fluid circuit for exchanging heat energy between the battery 5 and a coolant originating from the charging station 2, as described hereinafter.

The charging session performed by the charging station 2 may be a fast charging session wherein a relatively high current is used to charge the battery 5 in order to reduce the time required to complete the charging session. The fast charging session may accordingly result in an increased demand for the cooling of the associated battery 5 in comparison to a traditional charging session utilizing a decreased current level. However, it should be understood by one skilled in the art that the structure and methods disclosed herein may be adapted for use with any form of charging apparatus suitable for charging the battery 5 of the electric vehicle 1 at any desired charging rate using any desired current.

The battery 5 may be electrically coupled to an onboard battery charger 95 of the electric vehicle 1 via onboard charging cables 96 routed through the electric vehicle 1. The onboard battery charger 95 may be electrically connected to a charging port 97 of the vehicle 1 disposed at an exterior thereof, wherein the charging port 97 may be adapted for coupling with an external power source 92 associated with the charging station 2 via a corresponding cable 98 and plug 99, as one non-limiting example. One skilled in the art should appreciate that the disclosed charging configuration is merely exemplary, and that any structure or method of charging the battery 5 via a power source associated with the charging station 2 resulting in the heating of the battery 5 may be utilized while remaining within the scope of the present invention.

The electric vehicle 1 is shown as including a refrigerant circuit 10 associated with an HVAC system of the electric vehicle 1, a battery coolant circuit 30 associated with a cooling or heating of the battery 5 of the electric vehicle 1 during operation of the electric vehicle 1, and a charging coolant flow path 50 forming a portion of at least one additional fluid circuit or flow path, as described in greater detail hereinafter.

The refrigerant circuit 10 includes a compressor 11, a condenser 12 disposed downstream of the compressor 11 with respect to a direction of flow of a refrigerant through the refrigerant circuit 10, and a branch point 13 disposed downstream of the condenser 12. The condenser 12 is configured to exchange heat between the refrigerant when at a relatively high temperature and high pressure and air originating from the ambient environment.

The branch point 13 divides the refrigerant circuit into an evaporator flow path 14 and a chiller flow path 15 arranged in a parallel flow arrangement with the evaporator flow path 14 and the chiller flow path 15 and reconnected at a position disposed upstream of the compressor 11. The evaporator flow path 14 includes a first expansion valve 16 disposed upstream of an evaporator 17 with respect to the flow of the refrigerant through the evaporator flow path 14. The evaporator 17 may be disposed within an air handling casing 18 of the HVAC system of the electric vehicle 1, wherein the air handling casing 18 defines a flow path therethrough for conditioning air to be distributed to the passenger compartment of the electric vehicle 1. The air handling casing 18 may further include a heater core 19 or other heating device for further conditioning the air to be delivered to the passenger compartment. The heater core 19 may be a PTC heater utilizing electric energy supplied by the battery 5 for heating the air delivered to the passenger compartment of the electric vehicle 1, as desired.

Although not illustrated as such, the heater core 19 may alternatively be provided as an additional condenser/gas cooler of the refrigerant circuit 10 that is used to reject heat from the refrigerant when in a high temperature and high pressure state in order to aid in heating the passenger compartment of the electric vehicle. For example, the heater core 19 may be arranged in a parallel flow arrangement relative to the aforementioned condenser 12 while remaining in fluid communication with the air passing through the air handling casing 18. A suitable valve arrangement may be provided in order to distribute the refrigerant to the condenser 12, the heat core 19 acting as condenser/gas cooler, or any combination thereof for heating the air passed through the air conditioning casing 18 to a desired temperature. The heater core 19 may further be provided as a combination of the aforementioned PTC heater and parallel arranged condenser/gas cooler, as desired, without departing from the scope of the present invention.

The chiller flow path 15 includes a second expansion valve 20 disposed upstream of a heat exchanger acting as a chiller 21 with respect to the flow of the refrigerant through the chiller flow path 15. The chiller 21 also forms a portion of the battery coolant circuit 30 and is in heat exchange and fluid communication with each of a first coolant circulated by the battery coolant circuit 30 and the refrigerant circulated by the refrigerant circuit 10. The first coolant may be any form of suitable liquid coolant such as water, glycol, or mixtures thereof, as desired, and is hereinafter referred to as the battery coolant. The chiller 21 is accordingly configured for exchanging heat between the refrigerant of the refrigerant circuit 10 and the battery coolant of the battery coolant circuit 30.

The first expansion valve 16 and the second expansion valve 20 are each configured to be controllable to a plurality of different cross-sectional flow areas in order to alter a degree of contraction and subsequent expansion of the refrigerant when passing through each respective expansion valve 16, 20. The first expansion valve 16 and the second expansion valve 20 are also each configured to be adjustable to a closed position wherein the refrigerant is prevented from flowing past the corresponding expansion valve and towards the associated and downstream arranged heat exchanger in the form of the evaporator 17 or the chiller 21.

When not in the fully closed position or a fully opened position, each of the disclosed expansion valves 16, 20 is configured to lower the temperature and the pressure of the liquid refrigerant exiting the condenser 12 of the refrigerant circuit 10. The evaporator 17 is accordingly configured to transfer heat from the air passed through the air handling casing 18 to the relatively low temperature and low pressure refrigerant while the chiller 21 is configured to transfer heat from the battery coolant circulated by the battery coolant circuit 30 to the relatively low temperature and low pressure refrigerant. The refrigerant exiting either of the evaporator 17 or the chiller 21 may then be returned to a low pressure side of the compressor 11 to complete another cycle through the refrigerant circuit 10.

The ability for each of the expansion valves 16, 20 to be adjustable to a closed position allows for the refrigerant to flow to only one or the other of the evaporator 17 or the chiller 21 during operation of the compressor 11 and hence the refrigerant circuit 10. Alternatively, each of the expansion valves 16, 20 may be selectively placed in a desired open or constricted position allowing for passage of the refrigerant thereby to simultaneously distribute the refrigerant to each of the flow paths 14, 15. Additionally, the ability to control the cross-sectional flow area through either of the expansion valves 16, 20 further allows for the cooling capacity of each of the evaporator 17 and the chiller 21 to be adjustable in accordance with a selected mode of operation of the refrigerant circuit 10.

In some circumstances, such as when the refrigerant circuit 10 is operated in a heat pump mode for heating the passenger compartment of the electric vehicle 1 during especially low ambient temperatures, the chiller 21 may beneficially allow for the heat generated by the battery 5 to be supplied to the refrigerant of the refrigerant circuit 10 for more efficiently heating the air delivered to the passenger compartment. The use of the heat generated by the battery 5 to heat the air delivered to the passenger compartment may be achieved if the heater core 19 is provided as a condenser/gas cooler of the refrigerant circuit 10 as described hereinabove, as one non-limiting example.

The battery coolant circuit 30 includes a first pump 31 causing the battery coolant to flow in order through a charging heat exchanger 32, a heating element 33, the battery 5, and the chiller 21. Additional elements may be included in the battery coolant circuit 30 without necessarily departing from the scope of the present invention. Furthermore, the disclosed elements may be included in alternative orders and configurations so long as the charging heat exchanger 32 is in a position suitable for removing heat from the battery coolant as supplied by the heat generated by the battery 5. The first pump 31 may be any form of suitable liquid pump capable of circulating the battery coolant through the battery coolant circuit 30 at a desired volumetric flow rate. The heating element 33 may be configured to selectively add heat energy to the battery coolant under a limited set of circumstances wherein heating of the battery 5 and the associated components may be desired, such as when the battery 5 requires additional heating when exposed to especially low ambient temperatures tending to cause the battery 5 to operate inefficiently, such as when first activated. The heating element 33 may also be used to add heat to the battery 5 during the initial stages of a charging session thereof when the battery 5 is once again subjected to the relatively low ambient temperatures. The heating element 33 may be a PTC heater or a heat exchanger in heat exchange and fluid communication with another heated fluid such as another coolant circulated through the electric vehicle 1 or a high temperature portion of the refrigerant routed towards the battery coolant circuit 30, as desired. In some circumstances, the heating element 33 may be a condenser/gas cooler provided in a parallel flow arrangement similar to the description of the heater core 19 hereinabove, wherein a suitable valve arrangement once again controls the distribution of the refrigerant between the various different condensers/gas coolers. The heating element 33 may also be provided as any combination of the heating devices and heat exchangers described herein without necessarily departing from the scope of the present invention.

The charging heat exchanger 32 is in fluid communication and heat exchange relationship with each of the battery coolant circulating through the battery coolant circuit 30 and a second coolant caused to flow selectively through the charging coolant flow path 50. The second coolant may be any form of suitable liquid coolant such as water, glycol, or mixtures thereof, as desired, and is hereinafter referred to as the charging coolant. The charging heat exchanger 32 may be any type of liquid-to-liquid heat exchanger such as a plate type heat exchanger, as one non-limiting example. However, it should be understood that any heat conductive structure suitable for allowing for heat to transfer between the battery coolant and the charging coolant via the charging heat exchanger 32 may be used without departing from the scope of the present invention, so long as the corresponding heat exchanging structure transfers the heat at a rate suitable for meeting the increased cooling demands of the battery 5 during the charging session as described herein.

The charging coolant flow path 50 includes an inlet flow path 51 extending between an inlet port 53 of the electric vehicle 1 and an upstream end of the charging heat exchanger 32 as well as an outlet flow path 52 extending between an outlet port 54 of the electric vehicle 1 and a downstream end of the charging heat exchanger 32. The inlet port 53 includes structure for coupling to an inlet fitting 55 of the charging station 2 while also providing a fluid tight seal at the junction between the inlet port 53 and the inlet fitting 55. Similarly, the outlet port 54 includes structure for coupling to an outlet fitting 56 of the charging station 2 while also providing a fluid tight seal at the junction between the outlet port 54 and the outlet fitting 56. The inlet fitting 55 may be disposed at an end of an inlet conduit 57 extending from the charging station 2 while the outlet fitting 56 may be disposed at an end of an outlet conduit 58 extending from the charging station 2. The inlet conduit 57 and the outlet conduit 58 may each be provided as hoses formed from a flexible material to facilitate an ease of connection of the inlet fitting 55 to the inlet port 53 and the outlet fitting 56 to the outlet port 54.

The inlet port 53 and the outlet port 54 may each be formed at a suitable location on an exterior of the electric vehicle 1. For example, the inlet port 53 and the outlet port 54 may be positioned adjacent the charging port 97 of the electric vehicle 1 used for connecting the electric vehicle 1 to the independent power source 92 of the charging station 2, as desired, in order to facilitate an ease of connection to each of the hoses/cables associated with the charging station 2. The connection formed between each of the ports 53, 54 and each of the fittings 55, 56 may be a quick connect/disconnect feature wherein the fluid tight seal is formed by some combination of axial motion, rotation, or actuation of a portion of one of the ports 53, 54 or one of the fittings 55, 56 as is conventional. One skilled in the art should appreciate that any form of coupling for establishing a fluid tight seal may be utilized without necessarily departing from the scope of the present invention.

It should be understood that the inlet port 53 and the outlet port 54 may be formed in one assembly suitable for coupling with a single fitting acting as both the inlet fitting 55 and the outlet fitting 56, thereby allowing for a single conduit or hose having a longitudinally extending fluid divider or connecting portion to be used when connecting to the charging coolant flow path 50, as desired. Alternatively, the ports 53, 54 and/or fittings 55, 56 may be coupled to each other while associated with a pair of separate conduits 57, 58, as desired. In some embodiments, the charging cable 98 and the associated plug 99 may also be integrated into the structure of the fittings 55, 56 and the conduits 57, 58 to further simplify the connection of the components associated with the charging station 2 to the electric vehicle 1.

The charging coolant flow path 50 is configured to selectively form a portion of either of a charging coolant circuit 60 or a vacuum flow path 70, wherein the charging coolant flow path 50 is selectively in fluid communication with only one of the charging coolant circuit 60 or the vacuum flow path 70 at a single time via a suitable valve arrangement as disclosed hereinafter. The charging coolant circuit 60 is configured to circulate the aforementioned charging coolant through the charging coolant flow path 50 in order to remove heat from the battery coolant within the charging heat exchanger 32 while the vacuum flow path 70 is configured to remove any excess charging coolant from the charging coolant flow path 50 following the heat exchange process carried out by the charging coolant within the charging heat exchanger 32. Each of the charging coolant circuit 60 and the vacuum flow path 70 include structure exclusively associated with the charging station 2 and hence provided independently of the associated electric vehicle 1.

The charging coolant circuit 60 includes a charging coolant reservoir 61, a charging coolant pump 62, a cooling heat exchanger 90, a three-way inlet valve 63, the inlet conduit 57, the charging coolant flow path 50, the outlet conduit 58, a three-way outlet valve 64, and a charging coolant filter 65 in an order of flow of the charging coolant through the charging coolant circuit 60. The charging coolant reservoir 61 forms a source of the charging coolant to be circulated throughout the charging coolant circuit 60. The charging coolant pump 62 is configured to cause the charging coolant to be pumped out of the charging coolant reservoir 61 and towards the charging coolant flow path 50. The three-way inlet valve 63 forms a portion of the aforementioned valve arrangement and is adjustable between a first position and a second position, wherein the first position provides fluid communication between the charging coolant flow path 50 and an inlet side 67 of the charging coolant circuit 60 while the second position provides fluid communication between the charging coolant flow path 50 and an inlet side 77 of the vacuum flow path 70. The three-way outlet valve 64 also forms a portion of the aforementioned valve arrangement that is similarly adjustable between a first position and a second position, wherein the first position provides fluid communication between the charging coolant flow path 50 and an outlet side 68 of the charging coolant circuit 60 while the second position provides fluid communication between the charging coolant flow path 50 and an outlet side 78 of the vacuum flow path 70. It should be apparent to one skilled in the art that the three-way inlet valve 63 and the three-way outlet valve 64 may each be replaced with a pair of two-way valves with each of the two-way valves disposed on one of the inlet side 67, 77 or the outlet side 68, 78 of the respective circuit/flow path 60, 70, as desired, without altering operation of the charging station 2 as described herein. The three-way inlet valve 63 and the three-way outlet valve 64 may be repositioned between the respective first and second positions simultaneously in order to instantaneously switch the charging coolant flow path 50 from being in fluid communication with either of the charging coolant circuit 60 or the vacuum flow path 70 depending on the selected mode of operation of the charging station 2.

The cooling heat exchanger 90 is disposed between the charging coolant reservoir 61 and the three-way inlet valve 63 with the cooling heat exchanger 90 configured to lower the temperature of the charging coolant prior to introduction into the charging coolant flow path 50. In the illustrated embodiment, the cooling heat exchanger 90 is a component of a vapour compression circuit 40 including a compressor 41, a condenser/gas cooler 42, an expansion valve 43, and the cooling heat exchanger 90 acting as a chiller/evaporator of the vapour compression circuit 40. The cooling heat exchanger 90 is formed by a heat exchanging structure in fluid communication and heat exchange communication with each of the refrigerant of the vapour compression circuit 40 and the charging coolant of the charging coolant circuit 60.

The vapour compression circuit 40 may be provided to include a substantially greater cooling capacity than the typical refrigerant circuit 10 provided within the electric vehicle 1 as a result of the vapour compression circuit 40 not being limited by the typical packaging and power constraints associated with the typical operation of the electric vehicle 1. The vapour compression circuit 40 circulates a suitable refrigerant that is expanded to a low temperature and low pressure phase within the expansion valve 43 prior to entry into the cooling heat exchanger 90, wherein the low temperature and low pressure refrigerant of the vapour compression circuit 40 is lower in temperature than the charging coolant of the charging coolant circuit 60. The cooling heat exchanger 90 is accordingly configured to output the charging coolant at a decreased temperature in order to increase the cooling capacity of the charging heat exchanger 32 within the charging flow path 50 of the electric vehicle 1. The charging coolant is introduced into the charging coolant flow path 50 after having heat rejected therefrom within the cooling heat exchanger 90 for each cycle of the charging coolant passing through the charging coolant flow path 50 to sustain the increased cooling capacity of the charging heat exchanger 32 throughout the entirety of the charging process of the battery 5 using the power source 92.

The charging coolant filter 65 is shown as being disposed immediately upstream of the charging coolant reservoir 61 and is configured to remove any contaminants or debris from the charging coolant that may be carried by the charging coolant at other locations along the charging coolant circuit 60 including within the charging coolant flow path 50 of the electric vehicle 1. The charging coolant filter 65 may be disposed at other locations along the charging coolant circuit 60, including between the charging coolant reservoir 61 and the charging coolant pump 62, without necessarily departing from the scope of the present invention. It may be beneficial for the charging coolant filter 65 to be disposed upstream of the charging coolant pump 62 in order to maintain a durability of the charging coolant pump 62 during operation thereof, as desired.

The vacuum flow path 70 is configured to remove any of the charging coolant that may be disposed within the charging coolant flow path 50 following the circulating of the charging coolant therethrough in order to prevent the presence of the charging coolant within the charging coolant flow path 50 at intervals between subsequent charging sessions of the electric vehicle 1. The vacuum flow path 70 includes an upstream end formed by an air source 72, the three-way inlet valve 63, the inlet conduit 57, the charging coolant flow path 50, the outlet conduit 58, the three-way outlet valve 64, a waste reservoir 71, and a vacuum device 75 disposed at a downstream end of the vacuum flow path 70. The air source 72 is depicted as an air compressor in fluid communication with the ambient air for delivering high pressure air to the vacuum flow path 70 from an upstream end thereof, but may alternatively be an open ended conduit in fluid communication with the ambient air at atmospheric pressure without necessarily departing from the scope of the present invention. Although not depicted, a suitable air filter may be disposed between the air source 72 and the three-way inlet valve 63 to prevent the entry of contaminants or debris carried by the ambient air from entering into the charging coolant flow path 50 or the remainder of either of the charging coolant circuit 60 or the vacuum flow path 70, as desired.

The vacuum device 75 may be in fluid communication with a portion of the waste reservoir 71 occupied by air to allow for the downstream arranged vacuum device 75 to generate the suction necessary to cause the ambient air entering the vacuum flow path 70 at the air source 72 to flow towards the vacuum device 75 without drawing the waste charging coolant disposed within the waste reservoir 71 towards the vacuum device 75. The vacuum device 75 includes an outlet end in fluid communication with the ambient air to allow the air passed through the vacuum flow path 70 to be expelled to the ambient environment. Alternatively, the vacuum device 75 may be disposed upstream and above the waste reservoir 71 in a manner wherein any waste charging coolant suctioned through the vacuum flow path 70 can be gravity fed into the waste reservoir 71 while the vacuumed air is expelled to the ambient environment. In yet another embodiment, the outlet side 78 of the vacuum flow path 70 may include a filter (not shown) to remove any contaminants or debris from the waste charging coolant in a manner allowing for the waste charging coolant to be reintroduced to the charging coolant reservoir 61, as desired.

The manner in which the battery coolant circuit 30 includes the battery coolant placed in selective fluid communication and heat exchange communication with each of the refrigerant of the refrigerant circuit 10 and the charging coolant of the charging coolant flow path 50 allows for the battery coolant circuit 30 to be operated in variety of different operational modes depending on the circumstances faced by the electric vehicle 1 during a charging of the battery 5.

During some battery charging sessions, including the use of the aforementioned fast charging session, it may be beneficial to initially allow for the battery 5 to first reach a desired temperature level before any type of cooling is initiated via either of the chiller 21 of the refrigerant circuit 10 or the charging heat exchanger 32 of the charging coolant flow path 50. Such initial heating of the battery 5 may occur when the electric vehicle 1 is exposed to especially low ambient temperatures, such as temperatures below 0° C., as one non-limiting example. Additionally, the especially low ambient temperatures may also be conducive to the heat generated by the battery 5 being distributed to another heat exchanger associated with a heating of the passenger compartment of the electric vehicle 1 to more efficiently heat the passenger compartment during the charging session, such as delivering the heat from the battery 5 to the chiller 21 in order to add heat to the refrigerant of the refrigerant circuit 10 when operated in a heat pump mode as described briefly hereinabove when discussing the possible configurations of the heater core 19 and the heating element 33 relative to the remainder of the refrigerant circuit 10.

In other circumstances, the battery 5 may be in need of cooling during a charging session such as the fast charging session. When the cooling demand is low, such as when the temperature of the battery 5 has not reached a certain value or a relatively low current is used to charge the battery 5, the battery 5 may be cooled by rejecting heat from the battery coolant to the refrigerant of the refrigerant circuit 10 via the chiller 21. Specifically, the compressor 11 may be activated to cause the refrigerant to flow through the refrigerant circuit 10. The second expansion valve 20 may be opened to allow for at least a portion, if not all, of the refrigerant to pass through the chiller 21 when in a low temperature and low pressure state. Concurrently, the first pump 31 causes the battery coolant to circulate through the battery coolant circuit 30 while the heating element 33 is turned off and not providing additional heat to the battery coolant. The battery coolant removes heat from the battery 5 which is in turn ejected to the refrigerant when passing through the chiller 21.

However, under certain circumstances, such as during a fast charging session, the battery 5 may not be capable of being sufficiently cooled via use of the chiller 21 of the refrigerant circuit 10. The charging system is accordingly switched from using the chiller 21 to remove heat from the battery coolant to using the charging heat exchanger 32 to remove the heat from the battery coolant. The use of the charging coolant passing through the charging heat exchanger 32 for cooling the battery 5 may accordingly be primarily utilized during fast charging sessions when the electric vehicle 1 is exposed to especially high ambient temperatures wherein the refrigerant circuit 10 may not have the necessary cooling capacity for properly cooling the battery 5 while also maintaining the desired comfort of the passengers of the electric vehicle 1 via the conditioning of the air delivered to the passenger compartment thereof.

The use of the charging coolant flow path 50 for cooling the battery 5 during a charging thereof using the power source 92 of the charging station 2 occurs as follows. First, an operator of the electric vehicle 1 attaches the inlet fitting 55 to the inlet port 53 and the outlet fitting 56 to the outlet port 54 while establishing a fluid tight seal at each respective junction. Next, the charging coolant pump 62 is activated with the three-way inlet valve 63 and the three-way outlet valve 64 each switched to the respective first positions for providing fluid communication between the charging coolant flow path 50 and each of the inlet side 67 and the outlet side 68 of the charging coolant circuit 60. The first pump 31 is also activated to cause the battery coolant to circuit through the battery coolant circuit 30 including passing through each of the battery 5 and the charging heat exchanger 32. The charging coolant flows from the charging coolant reservoir 61 towards the cooling heat exchanger 90 while the vapour compression circuit 40 is in operation to supply the low temperature and low pressure refrigerant to one side of the cooling heat exchanger 90. The charging coolant ejects heat to the refrigerant of the vapour compression circuit 40 to lower the temperature of the charging coolant. The charging coolant is then conveyed to the charging coolant flow path 50 and hence the charging heat exchanger 32 to cause heat to be transferred from the heated battery coolant of the battery coolant circuit 30 to the charging coolant within the charging heat exchanger 32. The charging coolant filter 65 continuously removes contaminants and debris from the charging coolant during the circulation thereof throughout the charging coolant circuit 60.

The battery coolant is continuously lowered in temperature within the charging heat exchanger 32 to allow the battery coolant to cool the battery 5 when passing therethrough. The use of the charging coolant, which can be provided to include a larger cooling capacity than the refrigerant circulated through the chiller 21 of the refrigerant circuit 10, thereby improves the overall cooling capacity of the battery coolant circuit 30 to aid in sufficiently cooling the battery 5, and especially during a fast charging session utilizing an increased supply of current for increasing the heat generated at the battery 5.

The exclusive use of the charging heat exchanger 32 to cool the charging coolant may also allow for the refrigerant circuit 10 to be simultaneously operated during the charging process in a manner wherein the refrigerant is distributed to the evaporator 17 while the compressor 11 is operated at less than maximum capacity. The distribution of the refrigerant to the evaporator 17 may accordingly include a closing of the expansion valve 20 such that a fluid and heat exchange relationship is not established between the battery coolant and the refrigerant within the chiller 21 during the charging session. The reduced operation of the compressor 11 can in turn lessen the incidence of the passenger of the electric vehicle 1 being exposed to NVH while still providing enough cooling capacity to maintain the interior of the passenger compartment at a desired temperature and humidity. For example, if the charging process takes several minutes to complete, the interior of the passenger compartment may otherwise be heated undesirably if exposed to high ambient temperatures or direct sun exposure, which in turn lowers the comfort of the passenger if seated within the passenger compartment during or immediately after the charging process.

In other circumstances, the battery coolant may be configured to reject the heat of the battery 5 to each of the refrigerant within the chiller 21 as well as the charging coolant within the charging heat exchanger 32. Such a dual mode of operation of the two different heat exchangers 21, 32 may further allow for the compressor 11 of the refrigerant circuit 10 to once again be operated at less than maximum capacity in a manner preventing the occurrence of NVH within the passenger compartment of the electric vehicle 1 while further increasing the cooling capacity of the battery coolant circuit 30. The refrigerant circuit 10 may also be configured in such a dual mode of operation to distribute the refrigerant to each of the chiller 21 and the evaporator 17 within the refrigerant circuit 10 in order to allow for the passenger compartment of the vehicle 1 to be cooled during the charging of the battery 5 in the manner described above. The expansion valves 16, 20 may accordingly be controlled to distribute the refrigerant to the different flow paths 14, 15 at desired pressures and temperatures for causing the desired cooling effect.

In any event, the conclusion of the charging of the battery 5 via the power source 92 may automatically result in the switching of the three-way inlet valve 63 and the three-way outlet valve 64 to the respective second positions thereof to place the charging coolant flow path 50 in fluid communication with each of the inlet side 77 and the outlet side 78 of the vacuum flow path 70. The first pump 31 may also be deactivated to discontinue the circulating of the battery coolant through the battery coolant circuit 30. The vacuum device 75 is activated to form a suction pressure for drawing air from the air source 72 in a manner removing any waste charging coolant from the interior of the charging coolant flow path 50. As mentioned previously, the air source 72 may be open to the ambient air at atmospheric pressure or may include an air compressor for aiding in the removal of the waste charging coolant from the charging coolant flow path 50 by providing an increased air pressure at a position upstream of the charging coolant flow path 50. The waste charging coolant flows through the vacuum flow path 70 until it is dispensed into the waste reservoir 71. As mentioned previously, alternative configurations may be utilized wherein the waste charging coolant is redistributed to the charging coolant reservoir 61 for use in subsequent cycles of the charging coolant circuit 60 without necessarily departing from the scope of the present invention.

The disclosed charging coolant circuit 60 may be reconfigured into any suitable arrangement for introducing the charging coolant to the charging coolant flow path 50, removing the charging coolant from the charging coolant flow path 50, and for cooling the charging coolant at some point prior to the introduction of the charging coolant into the charging coolant flow path 50 without necessarily departing from the scope of the present invention. For example, in some embodiments the charging coolant circuit 60 may be provided in the absence of any type of charging coolant reservoir 61, wherein the charging coolant is instead contained entirely within the tubing of the charging coolant circuit 60. Alternatively, the charging coolant may be provided as a continuously provided liquid such as water originating from a tap, wherein the water is once again able to be drained from the charging coolant circuit 60 after passing through the charging coolant flow path 50 in a manner eliminating the need for filtering or storing of the charging coolant.

Figure 2:
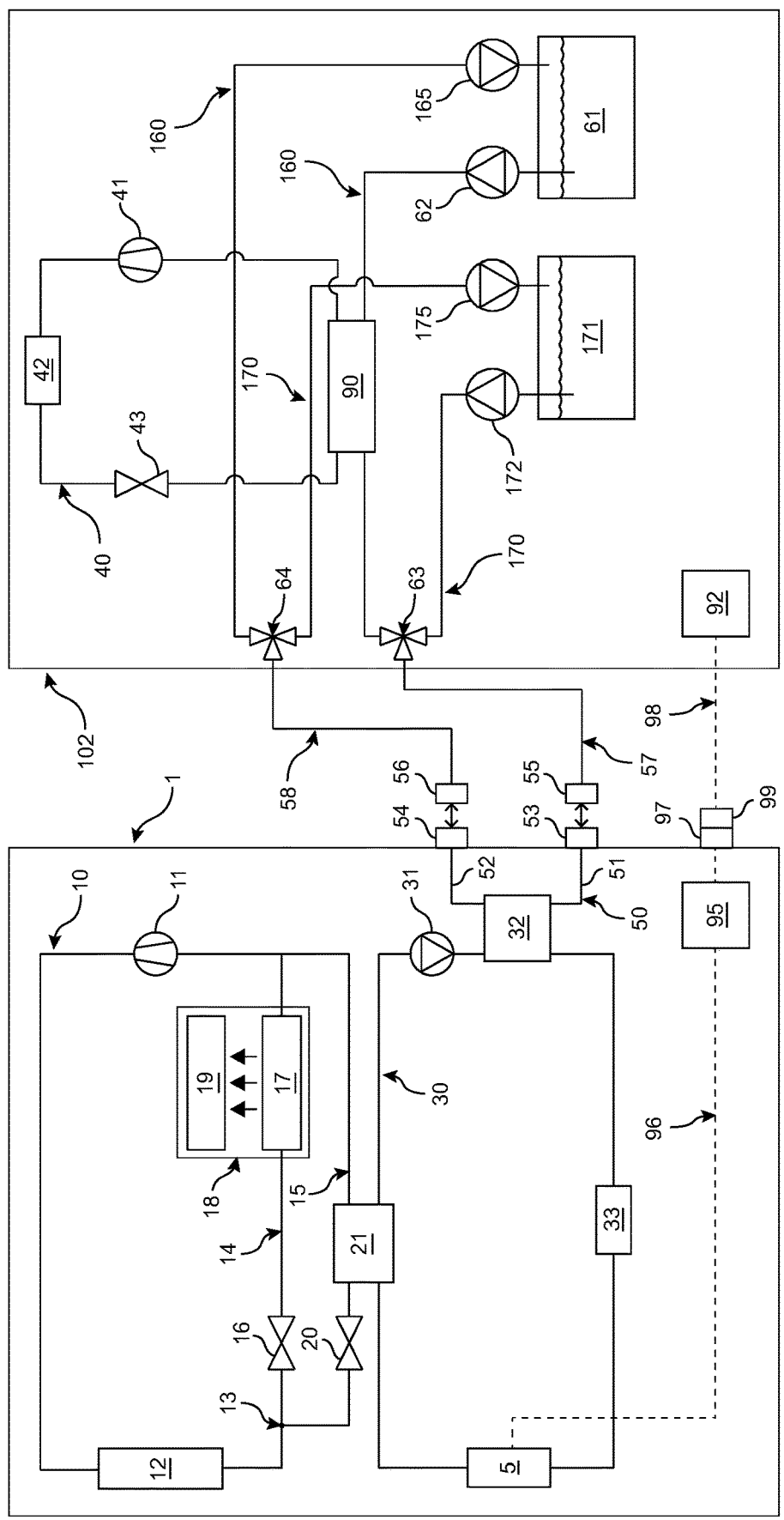
FIG. 2 is a schematic representations of a charging system including an electric vehicle having a refrigerant circuit and a battery coolant circuit as well as a charging station according to another embodiment of the present invention.

Referring now to FIG. 2, a charging station 102 according to another embodiment of the invention is disclosed. The associated electric vehicle 1 configured for use with the charging station 102 is identical to that depicted in FIG. 1, hence further description is omitted. Those components of the charging station 102 that are identical to the charging station 2 are denoted with the same reference numerals while variations thereof are denoted by reference numerals in the hundreds.

The charging coolant flow path 50 may form a portion of either of a charging coolant circuit 160 or a flushing fluid circuit 170, wherein the charging coolant flow path 50 is selectively in fluid communication with the fluid or fluids associated with only one of the circuits 160, 170 at a single time. The flushing fluid circuit 170 is configured to circulate a flushing liquid through the charging coolant flow path 50 while the charging coolant circuit 160 is configured to circulate the aforementioned charging coolant through the charging coolant flow path 50, wherein the charging coolant is cooled within the charging station 102 in order to improve the cooling capacity of the charging heat exchanger 32. Each of the flushing fluid circuit 170 and the charging coolant circuit 160 include components formed within a portion of the charging station 102 provided independently from the electric vehicle 1 and the associated components thereof.

The flushing fluid circuit 170 includes a flushing fluid reservoir 171, a flushing pump 172, the three-way inlet valve 63, the inlet conduit 57, the charging coolant flow path 50, the outlet conduit 58, the three-way outlet valve 64, and a flushing liquid removal mechanism 175. The flushing fluid reservoir 171 forms a source of the flushing fluid, which may be any flushing liquid such as water. The flushing pump 172 is configured to cause the flushing liquid to be pumped out of the fluid reservoir 171 and towards the charging coolant flow path 50. The flushing liquid removal mechanism 175 is configured to pump or vacuum the flushing liquid from the charging coolant flow path 50 in order to prepare the charging coolant flow path 50 for the introduction of the charging coolant when switched to being in fluid communication with the charging coolant circuit 160 via the three-way valves 63, 64 in similar fashion to the charging station 2.

The disclosed flushing fluid circuit 170 is merely exemplary in nature, and may be modified from the disclosed configuration so long as the flushing fluid circuit 170 is capable of introducing the flushing liquid to the charging coolant flow path 50 as well as removing the flushing liquid from the charging coolant flow path 50 following completion of the flushing process. The flushing fluid circuit 170 may, for example, be provided without the flushing liquid reservoir 171 into which the previously flushed liquid is directed after flowing through the charging coolant flow path 50. Instead, the flushing liquid may be provided continuously from a flushing liquid source, such as water from a tap, that is then drained or otherwise exhausted from the flushing fluid circuit 170. The flushing fluid circuit 170 may also include any necessary filters (not shown) or the like for removing debris from the flushing liquid in circumstances where the same flushing liquid is circulated through the flushing fluid circuit 170 multiple times.

The flushing liquid removal mechanism 175 is disclosed as a vacuum mechanism disposed downstream of the charging coolant flow path 50 for drawing the flushing liquid theretowards, but it should be understood that any mechanism suited for removal of the flushing liquid from the charging coolant flow path 50 may be used without departing from the scope of the present invention. For example, the flushing liquid removal mechanism 175 may instead be a source of pressurized air or the like in selective fluid communication with an inlet side 177 of the flushing fluid circuit 170. As such, the removal of the flushing fluid may be achieved by introducing the pressurized air to the flushing fluid circuit 170 at an upstream position wherein a supply of downstream arranged flushing liquid is forced out of the charging coolant flow path 50 through the outlet conduit 58. One skilled in the art will appreciate that a variety of different configurations may be used to achieve the flushing of the charging coolant flow path 50 as described herein.

The charging coolant circuit 160 includes a charging coolant reservoir 61, a charging coolant pump 62, the cooling heat exchanger 90, the three-way inlet valve 63, the inlet conduit 57, the charging coolant flow path 50, the outlet conduit 58, the three-way outlet valve 64, and a charging coolant removal mechanism 165. The charging coolant removal mechanism 165 is configured to pump or vacuum the charging coolant from the charging coolant flow path 50 upon completion of the charging process.

In some embodiments, a common liquid may be used to perform both the flushing and the cooling processes associated with the charging coolant flow path 50. In such circumstances, the charging coolant may be filtered in a manner such that the filtered charging coolant acts as both the flushing liquid and the charging coolant, as any debris in need of removal from the charging coolant flow path 50 may be filtered from the charging coolant before reintroduction into the charging coolant flow path 50.

The modified charging station 102 operates as follows during the charging of the battery 5 using the power source 92. First, an operator of the electric vehicle 1 attaches the inlet fitting 55 to the inlet port 53 and the outlet fitting 56 to the outlet port 54. Next, the flushing process is carried out by introducing the flushing liquid to the charging coolant flow path 50 before eventually removing the flushing liquid from the charging coolant flow path 50 via the flushing liquid removal mechanism 175. Once the flushing liquid is adequately flushed, the charging coolant flow path 50 is ready to receive the charging coolant after the charging coolant has been cooled within the cooling heat exchanger 90 while the first pump 31 is activated to circulate the battery coolant through the battery coolant circuit 30. The charging coolant is continuously circulated through the charging coolant flow path 50 and hence the charging heat exchanger 32 to cause heat to be continuously transferred from the battery coolant of the battery coolant circuit 30 to the charging coolant within the charging heat exchanger 32. The battery coolant is accordingly lowered in temperature to allow the battery coolant to cool the battery 5 when passing therethrough. The refrigerant circuit 10 may also be operated in any of the modes described hereinabove for simultaneously rejecting the heat from the battery coolant within the chiller 21 or for cooling the passenger compartment of the electric vehicle 1 during the charging of the battery 5, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electric vehicle comprising:
a battery coolant circuit including a battery and a charging heat exchanger, the battery coolant circuit circulated by a battery coolant in fluid communication and heat exchange communication with each of the battery and the charging heat exchanger, the charging heat exchanger configured for selective fluid communication and heat exchange communication with a charging coolant originating external to the electric vehicle, wherein the charging coolant is passed through a charging coolant flow path formed within the electric vehicle and including the charging heat exchanger, wherein the charging coolant flow path extends from an inlet port to an outlet port of the electric vehicle, and wherein the charging coolant flow path includes an inlet flow path connected to the inlet port and an outlet flow path connected to the outlet port.

2. The electric vehicle of claim 1, wherein each of the inlet port and the outlet port is disposed at an exterior of the electric vehicle.

3. The electric vehicle of claim 1, wherein the inlet port is configured for forming a fluid tight connection with an inlet fitting associated with a charging station while the outlet port is configured for forming a fluid tight connection with an outlet fitting associated with the charging station.

4. The electric vehicle of claim 1, wherein the charging coolant originates from a charging station configured to charge the battery using an independently provided power source.

5. The electric vehicle of claim 1, wherein the charging heat exchanger is also configured for selective fluid communication with one of a flow of air or a flow of the flushing liquid originating external to the electric vehicle.

6. The electric vehicle of claim 1, further comprising a refrigerant circuit circulated by a refrigerant, the refrigerant circuit including a chiller in fluid communication and heat exchange communication with each of the refrigerant of the refrigerant circuit and the first coolant of the battery coolant circuit.

7. The electric vehicle of claim 6, wherein the refrigerant circuit further includes an evaporator for conditioning air to be supplied to a passenger compartment of the electric vehicle.

* * * * *